US008534724B2

(12) United States Patent
Ballesteros

(10) Patent No.: US 8,534,724 B2
(45) Date of Patent: Sep. 17, 2013

(54) ASSEMBLY OF AN IMPACT BEAM AND AN ABSORBER

(75) Inventor: Fernando Ballesteros, Lyons (FR)

(73) Assignee: Compagnie Plastic Omnium, Lyons (FR)

( * ) Notice: Subject to any disclaimer, the term of this patent is extended or adjusted under 35 U.S.C. 154(b) by 326 days.

(21) Appl. No.: 12/594,712

(22) PCT Filed: Apr. 7, 2008

(86) PCT No.: PCT/FR2008/050617
§ 371 (c)(1),
(2), (4) Date: Jan. 11, 2010

(87) PCT Pub. No.: WO2009/010668
PCT Pub. Date: Jan. 22, 2009

(65) Prior Publication Data
US 2010/0109355 A1 May 6, 2010

(30) Foreign Application Priority Data
Apr. 6, 2007 (FR) ..................................... 07 54386

(51) Int. Cl.
*B60J 7/08* (2006.01)

(52) U.S. Cl.
USPC .......................................................... 293/132

(58) Field of Classification Search
USPC ................. 293/132, 133, 121, 136, 120, 134, 293/102, 109, 155; 296/187.09
See application file for complete search history.

(56) References Cited

U.S. PATENT DOCUMENTS

| | | | | |
|---|---|---|---|---|
| 1,885,435 | A * | 11/1932 | Hammond | 293/154 |
| 3,847,428 | A | 11/1974 | Uebelstadt | |
| 3,933,387 | A * | 1/1976 | Salloum et al. | 293/120 |
| 4,968,076 | A * | 11/1990 | Kuroki | 293/121 |
| 4,974,891 | A * | 12/1990 | Furuta | 293/104 |
| 5,080,411 | A * | 1/1992 | Stewart et al. | 293/122 |
| 5,265,925 | A * | 11/1993 | Cox et al. | 293/120 |
| 5,803,514 | A * | 9/1998 | Shibuya et al. | 293/133 |
| 6,003,912 | A * | 12/1999 | Schonhoff et al. | 293/122 |
| 6,068,424 | A * | 5/2000 | Wycech | 403/269 |
| 6,302,477 | B1 * | 10/2001 | Satou | 296/187.05 |
| 6,325,431 | B1 * | 12/2001 | Ito | 293/102 |

(Continued)

FOREIGN PATENT DOCUMENTS

| | | |
|---|---|---|
| DE | 2 135 855 | 1/1973 |
| FR | 2 829 734 A1 | 3/2003 |

(Continued)

OTHER PUBLICATIONS

FR Search Report completed Nov. 30, 2007 in corresponding FR Application No. 0754386.

(Continued)

*Primary Examiner* — Kiran B Patel
(74) *Attorney, Agent, or Firm* — Oliff & Berridge, PLC

(57) ABSTRACT

The invention relates to an assembly comprising a rear impact beam and an impact absorber. The beam and the absorber have respective fastener means fastening them to a motor vehicle body-in-white. The absorber is shaped to absorb a corner impact and is designed to be arranged in the vicinity of a rear corner of the body-in-white in line with the longitudinal direction of the beam so as to leave a gap between a proximal end of the beam and the absorber.

8 Claims, 2 Drawing Sheets

(56) References Cited

U.S. PATENT DOCUMENTS

| | | | | |
|---|---|---|---|---|
| 6,364,384 | B1 * | 4/2002 | Kemp et al. | 293/120 |
| 6,412,836 | B1 * | 7/2002 | Mansoor et al. | 293/132 |
| 6,416,094 | B1 * | 7/2002 | Cherry | 293/120 |
| 6,460,909 | B2 * | 10/2002 | Mansoor et al. | 293/120 |
| 6,485,072 | B1 * | 11/2002 | Werner et al. | 293/132 |
| 6,540,275 | B1 * | 4/2003 | Iwamoto et al. | 293/24 |
| 6,695,366 | B2 * | 2/2004 | Cherry | 293/120 |
| 6,726,261 | B2 * | 4/2004 | Goto et al. | 293/120 |
| 6,890,011 | B2 * | 5/2005 | Arvelo et al. | 293/133 |
| 6,908,130 | B2 * | 6/2005 | Reutlinger et al. | 293/155 |
| 6,983,964 | B2 * | 1/2006 | Murata et al. | 293/109 |
| 6,988,753 | B1 * | 1/2006 | Omura et al. | 293/13 |
| 6,997,490 | B2 * | 2/2006 | Evans et al. | 293/120 |
| 7,025,396 | B2 * | 4/2006 | Omura et al. | 293/102 |
| 7,059,642 | B2 * | 6/2006 | Ohno et al. | 293/120 |
| 7,159,911 | B2 * | 1/2007 | Nguyen et al. | 293/102 |
| 7,201,412 | B2 * | 4/2007 | Kashiwagi et al. | 293/109 |
| 7,222,896 | B2 * | 5/2007 | Evans | 293/120 |
| 7,226,097 | B2 * | 6/2007 | Adachi et al. | 293/120 |
| 7,296,833 | B2 * | 11/2007 | Mohapatra et al. | 293/121 |
| 7,410,018 | B2 * | 8/2008 | Satou | 180/68.4 |
| 7,874,600 | B2 * | 1/2011 | Hashimura | 293/102 |
| 2005/0057053 | A1 * | 3/2005 | Evans et al. | 293/133 |
| 2006/0145490 | A1 * | 7/2006 | Yamaguchi et al. | 293/109 |
| 2006/0181090 | A1 | 8/2006 | Boivin et al. | |
| 2006/0261611 | A1 * | 11/2006 | Mohapatra et al. | 293/107 |
| 2007/0024069 | A1 * | 2/2007 | Takagi et al. | 293/102 |
| 2007/0046043 | A1 * | 3/2007 | Ito | 293/120 |
| 2007/0138815 | A1 * | 6/2007 | Fukukawa et al. | 293/15 |
| 2007/0145755 | A1 * | 6/2007 | Shioya et al. | 293/121 |
| 2007/0182172 | A1 * | 8/2007 | Hasegawa | 293/102 |
| 2007/0187959 | A1 * | 8/2007 | Adachi et al. | 293/120 |
| 2007/0200375 | A1 * | 8/2007 | Ito et al. | 293/102 |
| 2007/0216198 | A1 * | 9/2007 | Nakamae et al. | 296/193.09 |
| 2007/0246956 | A1 * | 10/2007 | Nagai et al. | 293/155 |
| 2008/0012364 | A1 * | 1/2008 | Boggess | 293/120 |
| 2008/0054655 | A1 * | 3/2008 | Kizaki et al. | 293/133 |
| 2009/0024323 | A1 * | 1/2009 | Tanabe | 701/301 |
| 2009/0039662 | A1 * | 2/2009 | Frederick et al. | 293/132 |
| 2010/0109353 | A1 * | 5/2010 | Allen et al. | 293/120 |
| 2011/0006554 | A1 * | 1/2011 | Mani | 293/132 |

FOREIGN PATENT DOCUMENTS

| | | |
|---|---|---|
| JP | A 9-039694 | 2/1997 |
| WO | WO 03/104030 A2 | 12/2003 |
| WO | WO 2004/106146 A1 | 12/2004 |

OTHER PUBLICATIONS

International Search Report completed Nov. 21, 2008 in corresponding PCT Application No. PCT/FR2008/050617.

* cited by examiner

ASSEMBLY OF AN IMPACT BEAM AND AN ABSORBER

FIELD OF THE INVENTION

The present invention relates to the technical field of motor vehicle rear modules.

Rear modules are subjected to numerous requirements in terms of impacts, which requirements are specific to each country or region. Certain standards, and in particular the standard US 581, define specific requirements for a "corner impact" that do not exist in Europe, for the purpose of providing better protection of the body-in-white.

The term "corner impact" designates an impact that occurs at low speed on a rear corner of the vehicle, at a non-zero angle relative to the longitudinal direction of the vehicle, and for the standard US 581, an impact at 60° and at a speed of 1.5 miles per hour (mph), i.e. 2.5 kilometers per hour (km/h).

BACKGROUND OF THE INVENTION

To satisfy requirements concerning corner impacts, and in particular the requirements of the standard US 581, rear impact beams are known in the state of the art that are placed facing the rear bumper of the vehicle and that include, at each longitudinal end corresponding to a rear corner of the vehicle, an impact absorber made of foam, e.g. as described in document JP 9 039 694.

A vehicle provided with such a beam satisfies the requirements of standards concerning corner impact. Nevertheless, the inventors of the present invention have observed that the deformation of an absorber, in the event of a corner impact, leads to the entire beam being deformed, to such an extent that there may be damage to the elements that are situated on the beam for absorbing a rear impact (an impact in the longitudinal direction of the vehicle coming from behind and occurring at a speed of less than 16 km/h).

After a corner impact, a prior art beam is therefore no longer sufficiently effective in handling a subsequent corner impact.

OBJECT AND SUMMARY OF THE INVENTION

An object of the invention is to preserve the rear corner impact absorption structure of the beam after a corner impact.

To this end, the invention provides an assembly comprising a rear impact beam and an impact absorber, wherein the beam and the absorber include respective fastener means for fastening to a motor vehicle body-in-white, the absorber being shaped to absorb a corner impact and being designed to be arranged in the vicinity of a rear corner of the body-in-white in line with the longitudinal direction of the beam and in such a manner as to leave a gap between a proximal end of the beam and the absorber.

The term "proximal end" of the beam is used to designate the end of the beam in the longitudinal direction of the beam that is closest to the rear corner.

In this configuration, the length of the impact beam is shorter than its length in the prior art; it extends only as far as the side rails of the body-in-white to which it is fastened. The absorber for handling a corner impact is completely independent of the rear beam.

Thus, after a corner impact, the absorber deforms independently of the beam and, because of the gap, has limited influence on the beam, and if the gap is sufficient to cover the deformation of the absorber, it can even leave the beam completely untouched by a corner impact.

The beam then no longer needs to be replaced after a corner impact, thereby making it possible to reduce the cost of repairs after such an impact.

Furthermore, this configuration does not require two different types of beam to be used depending on the country in which the vehicle is sold. The inventors of the present invention have demonstrated that in order to comply with European impact standards (and in particular recommendation ECE42 corresponding to a lateral rear impact, i.e. a rear impact that takes place close to a rear corner of the vehicle), it suffices to mount a beam at the rear of the vehicle that extends only as far as the side rails, since in the event of a lateral rear impact, and given the bulging shape of bumpers, it is the portion of the beam that is situated in register with the side rails that handles the impact. This makes it easy to adapt the vehicle to the standards of the country in which it is to be sold, merely by incorporating or not incorporating absorbers in the corners of the vehicle.

Provision can thus advantageously be made for the beam of the assembly of the invention to be dimensioned in such a manner that each end of the beam in its longitudinal direction is suitable for positioning substantially in register with a side rail of the body-in-white.

In a particular embodiment, the absorber is shaped in such a manner that when it is mounted on the body-in-white that is subjected at the rear to an impact in a longitudinal direction of the vehicle, the absorber is placed in an offset configuration in which it is offset outwards and forwards relative to the body-in-white.

Thus, when the vehicle is subjected to a rear impact, in particular a lateral rear impact, the absorber may be flattened against the structure of the body-in-white so that it does not perform the role of a hard point for the rear impact, in particular this may be achieved by shaping the absorber in such a manner that its outside wall is closer to the body-in-white than the compressibility limit of the beam. Thus, the rear impact is handled solely by the rear beam, which beam does not need to be adapted because of the presence of additional hard points. As a result of the absorber retracting during a rear impact, an existing beam can thus be used without being redimensioned for a vehicle that includes absorbers at the corners of the vehicle.

The absorber may include at least two vertical fastener tabs inclined towards the outside of the vehicle when the absorber is mounted on the vehicle, with a gap in the vicinity of the body-in-white. This gap allows each of the fastener tabs to turn towards the outside and the front of the vehicle as a result of a rear impact, and allows the absorber to move in translation relative to the body-in-white.

The two fastener tabs may be inclined towards the outside of the vehicle relative to the longitudinal direction of the vehicle by an angle that is less than the impact direction during a corner impact, in particular at an angle no greater than 60°, and more particularly an angle lying in the range 30° to 60°, the absorber also including a lateral arm for extending along a rear lateral portion of the body-in-white. The two fastener tabs then begin to rotate towards the center of the vehicle, causing the absorber to move in translation towards the center of the vehicle, thereby encouraging elastic compression of the absorber so that the impact is absorbed. This movement in translation continues until the lateral arm of the absorber comes into contact with the body-in-white and prevents movement in translation, thereby enabling the rear beam to preserved.

In a particular embodiment, the absorber includes an array of ribs.

Advantageously, the absorber, when mounted on the vehicle, includes ribs that are vertical, being oriented towards the outside of the vehicle parallel to the impact direction during a corner impact, in particular at an angle lying in the range 30° to 80° relative to the longitudinal direction of the vehicle (for the standard US 581, 60° relative to the longitudinal direction), so as to optimize handling of the corner impact.

Advantageously, the ribs are configured to absorb the corner impact when the absorber is in the offset configuration.

The fastener means fastening the absorber to the body-in-white are clip-fastener means.

Preferably, the absorber is made of plastics material, in particular of polypropylene (PP).

Optionally, the absorber is incorporated in anti-denting reinforcement for placing in register with a bodywork part.

Preferably, the absorber does not have means fastening it directly to the beam and/or is completely spaced apart from the beam. In this way, the deformation of the absorber during a corner impact has even less influence on the beam.

The present invention also provides a combination of a motor vehicle body-in-white and an assembly of the invention comprising a beam and an absorber.

The present invention also provides a method of mounting an assembly of the invention on a motor vehicle body-in-white, comprising the following steps:

fastening the beam to the body-in-white via first fastener means; and fastening the absorber to the body-in-white via second fastener means distinct from the first fastener means;

the beam and the absorber being fastened to the body-in-white in such a manner that the absorber extends the beam in its longitudinal direction, with a gap being left between a proximal end of the beam and the absorber.

The present invention also provides an absorber forming part of an assembly of the invention.

The present invention also provides an absorber assembly of the invention together with a bodywork part, the absorber being made integrally with the bodywork part.

The bodywork part of the assembly may be selected from the elements in the following list:

at least a portion of a motor vehicle bumper skin; and a motor vehicle fender.

BRIEF DESCRIPTION OF THE DRAWINGS

The invention can be understood on reading the following description given purely by way of example and made with reference to the accompanying drawings, in which.

MORE DETAILED DESCRIPTION

Figure 1:
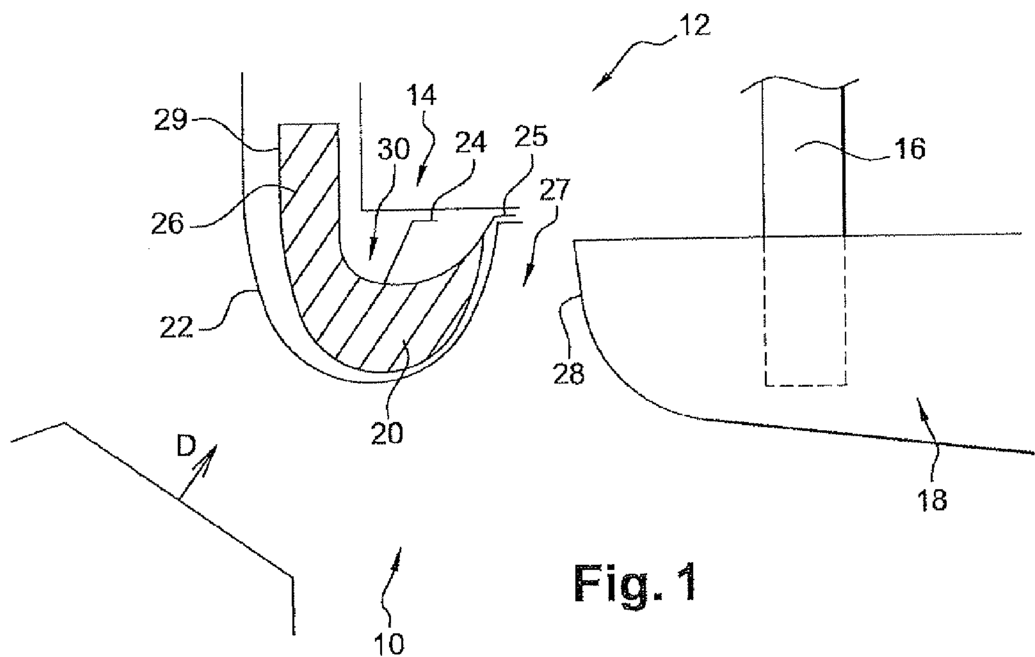
FIG. 1 is a plan view of an assembly of the invention comprising a beam and an absorber that are mounted on a motor vehicle body-in-white, shown in an initial configuration.

FIG. 1 shows a rear portion of a motor vehicle 10 comprising a body-in-white 12, with a rear corner 14 and a rear side rail 16 being shown more particularly. A rear impact beam 18 is fitted to the end of the rear side rail 16 using conventional fastener means (not shown). The beam is made of plastics material or of metal and it includes rear impact absorber means such as ribs or a crash box, these means not being shown in the figures.

An impact absorber 20 placed facing a bodywork part (here a portion of a bumper for a vehicle that presents a side board) is also shown in the figures. The absorber 20 is made of thermoplastic material, in particular of polypropylene. It is placed close to the rear corner 14 of the body-in-white 12 of the motor vehicle and in line with the longitudinal direction of the beam 18. It is connected to the body-in-white 12 by fastener means comprising two vertical fastener tabs 24 and 25 that are inclined towards the outside of the vehicle, at an angle relative to the longitudinal direction of the vehicle that is less than the angle of the impact direction D in the event of a corner impact (in particular less than 60°). The tab 24 may be fastened to the body-in-white by clip fastening, and the tab 25 may be fastened to the body with the bumper skin 22. The fastener tabs are distinct from the means for fastening the beam to the body-in-white. The absorber does not have any means fastening it directly to the beam.

The absorber also includes an array of ribs comprising vertical ribs 26 that are inclined towards the outside of the vehicle at an angle corresponding to the impact direction D during a corner impact.

The absorber 20 is shaped, and in particular the fastener means 24 and 25 are arranged, in such a manner that a gap 27 is left between the absorber and a proximal end 28 of the beam 18, which is the end of the beam in its longitudinal direction closest to the rear corner 14, such that the absorber 20 is completely spaced apart from the beam 18. A gap 30 is also provided close to the fastener means 24 and 25 between the body-in-white 12 and the absorber means proper (ribs 26) of the absorber 20, so as to leave the fastener tabs 24, 25 free to move.

In addition, the absorber 20 includes a lateral arm 29 extending along the rear lateral portion of the body-in-white 12.

Figure 2:
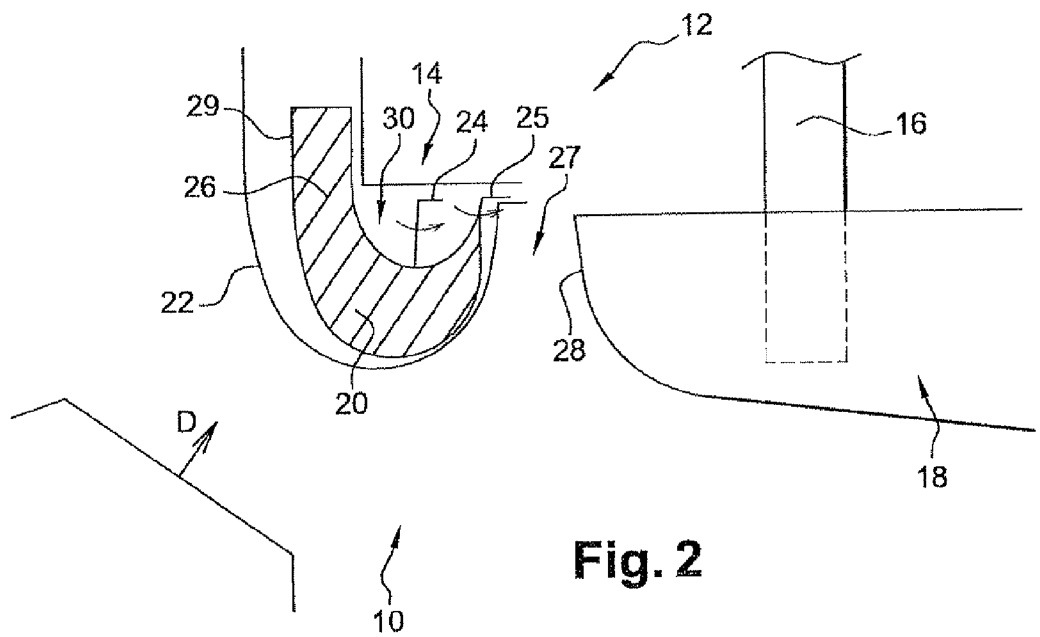
FIG. 2 is a plan view of the FIG. 1 assembly after a corner impact.

As shown in FIG. 2, when the vehicle is subjected to a corner impact of direction D, the fastener tabs 24, are caused to turn towards the center of the vehicle, moving the absorber 20 in translation towards the center. This movement of the absorber stops when a surface of its lateral arm 29 comes into abutment against the lateral portion of the body-in-white 12. The absorber has then been deformed and moved towards the center of the motor vehicle, reducing the size of the gap 27 between the absorber and the proximal end 28 of the beam 18. Simultaneously, the ribs 26 have performed a conventional impact-absorbing role. The movement of the absorber serves to improve impact absorption by guaranteeing a longer deformation stroke in elastic compression for the absorber 20.

During the movement of the absorber towards the center of the vehicle, the gap 27 serves to avoid the absorber 20 coming into contact with the beam 18 such that there is no need to replace the beam 18 after a corner impact.

Figure 3:
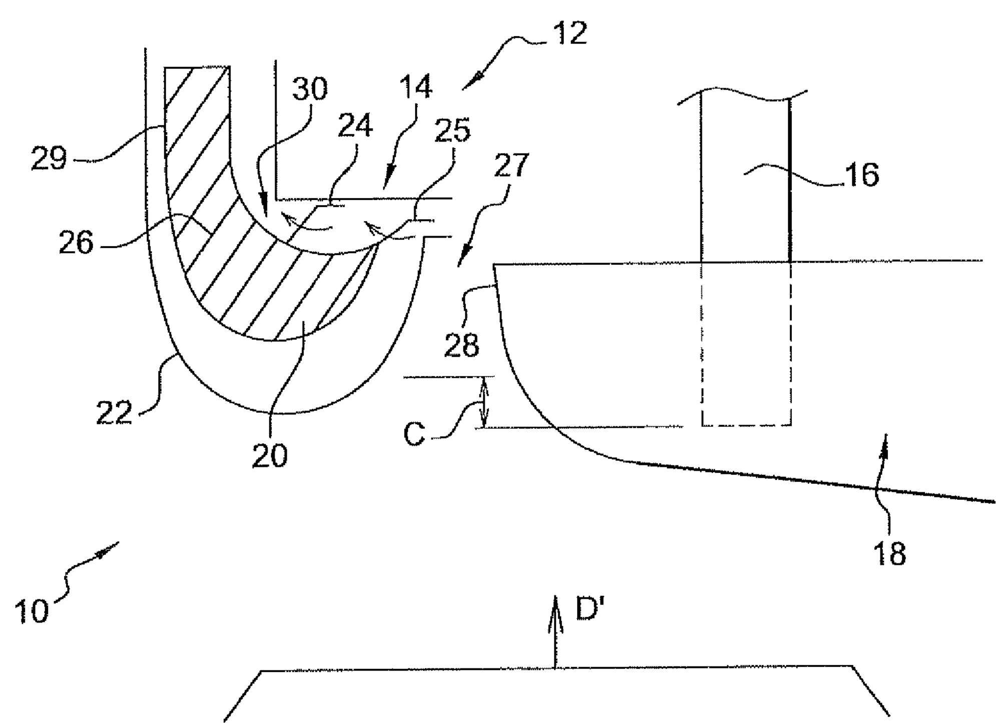
FIG. 3 is a plan view of the FIG. 1 assembly after a lateral impact.

FIG. 3 shows the beam 18, the absorber 20, and the movement of the absorber in the event of a lateral rear impact (in dashed lines). Under such circumstances, the impact direction is D', which corresponds substantially to the longitudinal direction of the vehicle. In the event of such an impact, the fastener tabs 24, 25 of the absorber 20 tend to begin turning and to move outwards and towards the front of the vehicle, thereby reducing the size of the gap 30 between the body-in-white 12 and the absorber 20. The absorber is thus flattened against the rear wall of the body-in-white such that it is situated behind the compressibility limit of the beam 18. Thus, in the event of a lateral rear impact, it is the beam 18, and in particular the portion of the beam 18 that is situated behind the side rail 16, that handles the impact. Because of the shape of its fastener tabs, the absorber 20 is moved into an offset configuration. It therefore does not constitute a hard point for such an impact and does not modify the way the impact is absorbed.

It should be observed that the ribs of the absorber are shaped in such a manner that when the absorber is in the offset configuration, it is capable of handling a corner impact. There is therefore no need to replace a corner impact absorber after a lateral rear impact.

There follows a description of the method of mounting the assembly comprising the beam 18 and the absorber 20 on the body-in-white 12.

The beam 18 is initially mounted on the body-in-white 12 and is assembled to the rear side rail 16 thereof in the vicinity of each of its ends in the longitudinal direction.

The absorber 20 is then placed on the body-in-white 12 in the vicinity of a rear corner of the body 12. It is fastened by clip-fastening to the body by means of the fastener tab 24.

The bumper skin 22 is then fitted onto the body 12 so as to cover the absorber 20.

The skin is also fastened to the body-in-white 12. Thereafter, fastening of the absorber 20 to the body-in-white 12 is completed by fastening the tab 25 of the absorber 20 to the body 12 with the bumper skin 22, e.g. using a single screw.

It should be observed that the invention is not limited to the embodiment described, which may receive any desirable modification that does not go beyond the ambit of the invention.

In a variant, the absorber may be incorporated in anti-denting reinforcement placed behind the bumper, or it may be placed facing a one-piece bumper, in which case the absorber is fastened to the body-in-white independently of the bumper skin.

The beam may also be fastened to the body-in-white after the absorber 20.

The invention claimed is:

1. An assembly comprising:

an impact beam that is configured to be positioned at a rear of a vehicle; and an impact absorber, wherein the impact beam and the impact absorber include respective fastener means for fastening to a motor vehicle body-in-white, the impact absorber being shaped to absorb a corner impact and being configured to be arranged in a vicinity of a rear corner of the motor vehicle body-in-white in line with a longitudinal direction of the impact beam and in such a manner as to leave a first gap between a proximal end of the impact beam and the impact absorber, the impact absorber being completely spaced apart from the impact beam, the impact absorber is shaped in such a manner that when the impact absorber is mounted on the motor vehicle body-in-white that is subjected at the rear corner to an impact in a longitudinal direction of the vehicle, the impact absorber is placed in an offset configuration in which the impact absorber is offset outwards and forwards relative to the motor vehicle body-in-white, the impact absorber includes at least two vertical fastener tabs inclined towards an outside of the vehicle when the impact absorber is mounted on the vehicle, with a second gap in a vicinity of the motor vehicle body-in-white, and the at least two fastener tabs are inclined towards the outside of the vehicle relative to the longitudinal direction of the vehicle by an angle that is less than an impact direction during a corner impact, in particular at an angle no greater than 60°, the impact absorber also including a lateral arm for extending along a rear lateral portion of the motor vehicle body-in-white.

2. The assembly according to claim 1, wherein the impact absorber includes ribs shaped to absorb the corner impact when the impact absorber is in the offset configuration.

3. The assembly according to claim 1, wherein the impact absorber, when mounted on the vehicle, includes ribs that are vertical being oriented towards an outside of the vehicle parallel to an impact direction during a corner impact, at an angle lying in the range 30° to 80° relative to a longitudinal direction of the vehicle.

4. The assembly according to claim 1, wherein the fastener means fastening the impact absorber to the motor vehicle body-in-white are clip-fastener means.

5. The assembly according to claim 1, wherein the impact absorber is made of a plastics material.

6. The assembly according to claim 1, wherein the impact absorber is incorporated in an anti-denting reinforcement for placing in register with a motor vehicle bodywork part.

7. The assembly according to claim 1, wherein the impact absorber does not have means fastening it directly to the impact beam.

8. The assembly according to claim 5, wherein the plastics material is polypropylene.

* * * * *